May 25, 1943.   O. T. BUFFALOW   2,320,261
BODY MASSAGING MACHINE
Filed Feb. 19, 1940   4 Sheets-Sheet 1

INVENTOR
Oscar T. Buffalow
BY Carmack Waterhouse
ATTORNEY

May 25, 1943.    O. T. BUFFALOW    2,320,261
BODY MASSAGING MACHINE
Filed Feb. 19, 1940    4 Sheets-Sheet 2
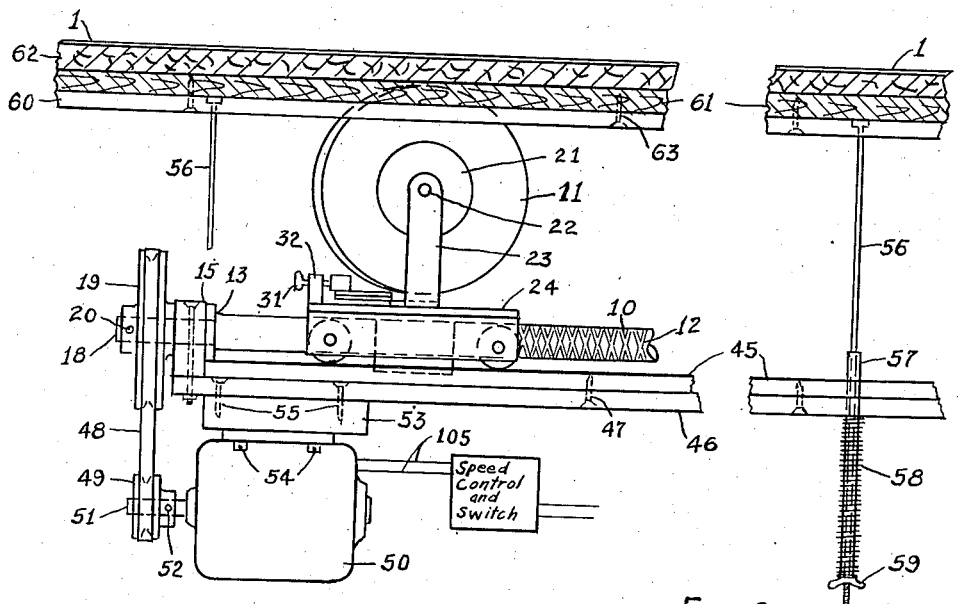
FIG. 8.
FIG. 9.
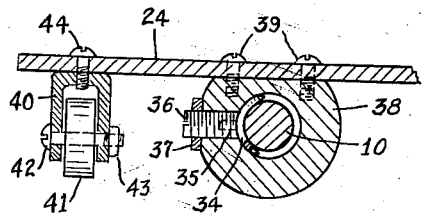
FIG. 10.
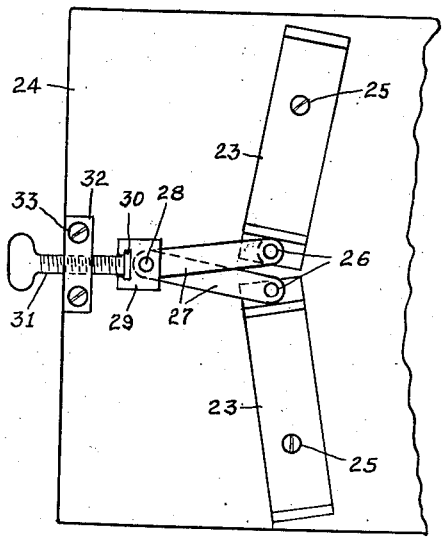
FIG. 11.
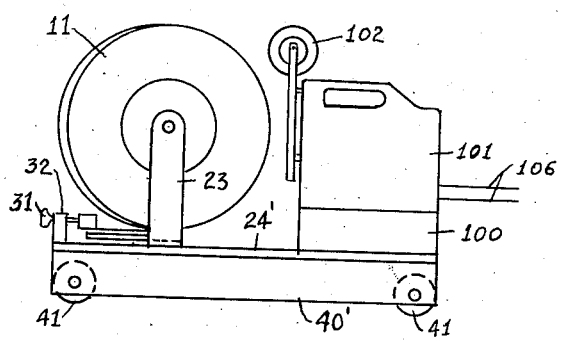
FIG. 12.
INVENTOR
Oscar T. Buffalow
BY Carmack Waterhouse
ATTORNEY

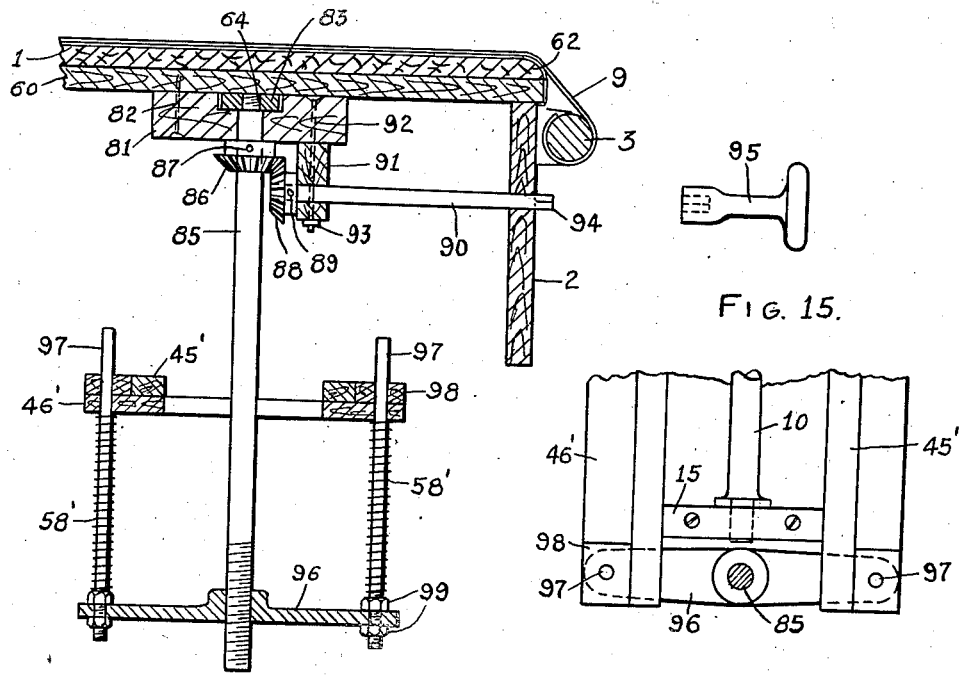
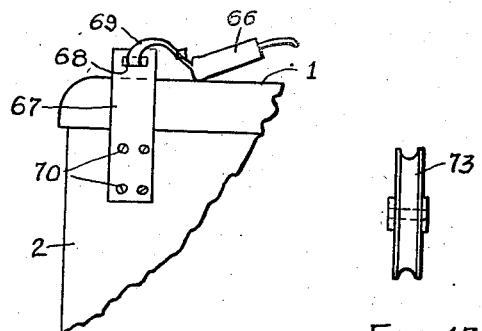
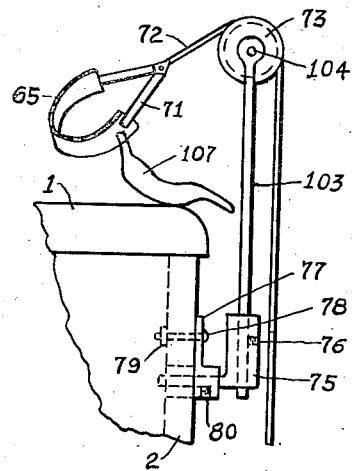
Fig. 13. Fig. 14. Fig. 15. Fig. 16. Fig. 17. Fig. 18.
INVENTOR
Oscar T. Buffalow
BY Carmack Waterhouse
ATTORNEY May 25, 1943.    O. T. BUFFALOW    2,320,261
BODY MASSAGING MACHINE
Filed Feb. 19, 1940    4 Sheets-Sheet 4
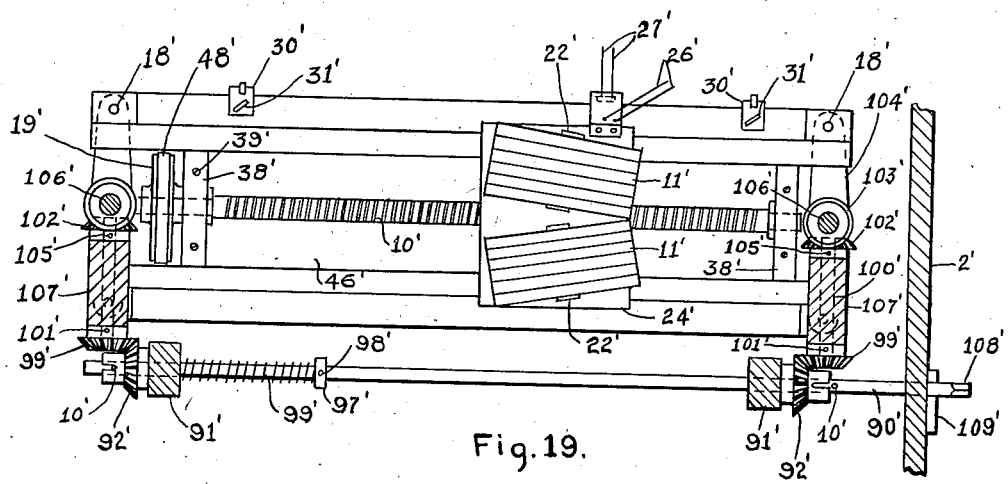
Fig. 19.
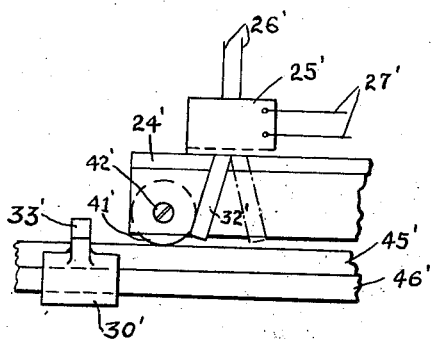
Fig. 20.
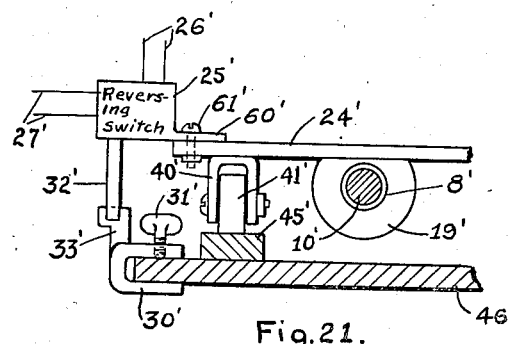
Fig. 21.
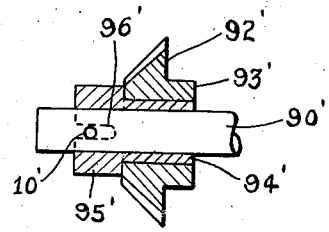
Fig. 22.
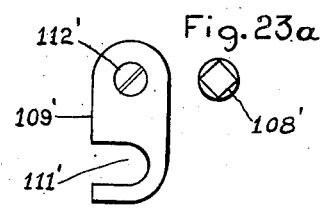
Fig. 23a.
Fig. 23.
INVENTOR
Oscar T. Buffalow.
BY
Carmack Waterhouse
ATTORNEY Patented May 25, 1943

2,320,261

UNITED STATES PATENT OFFICE 2,320,261

BODY MASSAGING MACHINE

Oscar Thomas Buffalow, Chattanooga, Tenn.

Application February 19, 1940, Serial No. 319,717

2 Claims. (Cl. 128—57)

My invention relates to massaging tables and more particularly to massaging tables having a massage attachment that reciprocates in an opening in the top of the table.

In the prior art, a form of massage machine for massaging the body by means of oblong reciprocating yielding rollers was known. W. C. Redfield, 2,175,614. Also a massage chair having specially designed kneading rollers for kneading the back on opposite sides of the spine was known to the prior art. E. R. Monroe, 1,645,339. However, the massage attachment of Monroe's chair is mounted on a one-way screw shaft, and only makes a single continuous negotiation of the shaft, when it must be released and started over again. The kneading rollers are mechanically driven and are not adjustable with respect to their angles relative to each other. The hand-operated massage table of Herbert L. Hoard, 1,501,341 embodies the simple idea of rollers placed on each side of the spine and reciprocated to massage the back. Hoard's rollers are rigidly mounted, not having resilience and not being angularly adjustable.

My invention has for its object a massage table or couch having a massage attachment reciprocated by means of a two-way screw shaft and a guide pin riding in alternate directions in the groove of the shaft.

Another object of my invention is the provision of a massaging unit complete in itself which may be installed in a table, couch or other suitable piece of furniture with but little alteration, and which automatically adjusts itself to the contour of the body, having adjustable roller applicator balls, which balls may be made of hard, medium or soft material, preferably of sponge rubber or felt, actuated by a double threaded screw or a single threaded screw with a reversible motor to reciprocate the applicator, and may operate in cooperation with means for placing tension on the spine during the massaging operation.

A further object of my invention is a massage table having the massage attachment swung thereunder and resting on springs or other resilient material to make it adaptable to the contours of the patient's body and responsive to any sudden unevenness or pressure from the patient's body.

A further object of my invention is a massage table having massage rollers that are angularly adjustable with respect to each other.

A further object of my invention is a massage table having foot straps or holders which cooperate with a chin and head strap and weights attached thereto to stretch the subject's body while being massaged.

A further object of my invention is a massage attachment, whereby the attachment may be moved to or from the table by means of adjusting the position and tension of the springs upon which it rests and the pressure of the attachment against the body thereby varied.

A further object of my invention is a modified form of massaging attachment including a vibrator of the type described in my patent for Applicator for vibratory massagers, No. 2,156,839 issued May 2, 1939, in combination with massage rollers.

A further object of my invention is the provision of an applicator including massaging rollers of resilient material such as sponge rubber, felt, etc.

A further object of my invention is a massage attachment having massage rollers composed of several laminated discs.

Other objects and advantages of my invention will appear from the following specifications and accompanying drawings, and the novel features thereof will be particularly pointed out in the annexed claims.

Referring to the accompanying drawings Figure 1 is a plan view of my massaging machine.

Figure 8 is an enlarged sectional view along the line 8—8 of Figure 1.

Figure 9 is a sectional view along the line 9—9 of Figure 1, showing one of the hanger rods which support the frame.

Figure 10 is a transverse sectional fragment, showing one of the roller wheels upon which the frame rides and a section of the casing and rider.

Figure 11 is a plan view of an enlarged fragment showing the mechanism for angular adjustment of the massage rollers.

Figure 12 is a side view of a modified massage attachment, having a massage vibrator in addition to massage rollers.

Figure 13 is a transverse sectional view of a machine having a modified support for raising and lowering the massage attachment.

Figure 14 is a plan view of a fragment of the modified machine shown in Figure 13, showing the supporting platform for carrying the massaging attachment.

Figure 15 shows the handle for adjusting the massaging attachment in the modified machine shown in Figure 13.

Figure 16 is a fragmental view showing a footstrap of the machine.

Figure 17 is a view of the pulley upon which the tackle attached to the neckband rides.

Figure 18 is a fragmental view showing the neckband and weight for pulling same.

Figure 19 is a fragmental plan view of a modification of my improved machine.

Figure 20 is a detail of my improved machine, showing the carriage and track for supporting and carrying the applicators.

Figure 21 is a fragmental sectional elevation of a portion of my improved machine showing the track and conveyor for the applicator.

Figure 22 is a detail fragmental portion of my improved gear for raising and lowering the carriage track.

Figure 23 is a detail of a bracket used in my improved combination.

Figure 24 is another detail of another element used in my improved machine.

Figure 1:
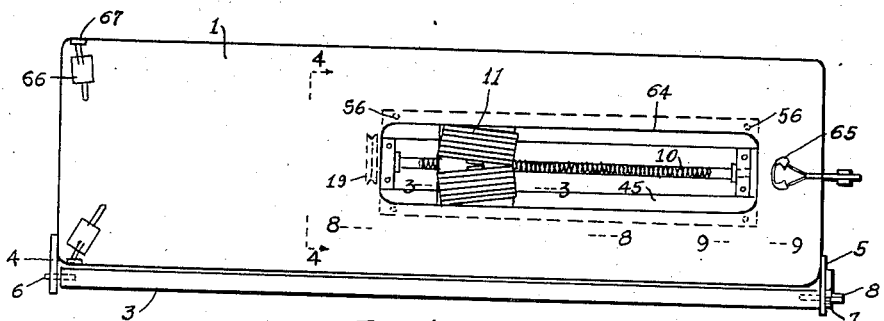
Figure 3:
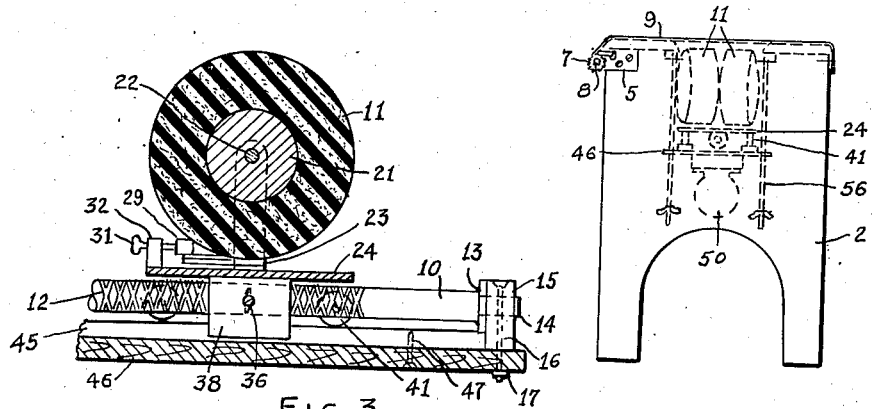
Figure 3 is an enlarged sectional view of the massaging rollers and surrounding frame parts along the lines 3—3 of Figure 1.
Figure 2:
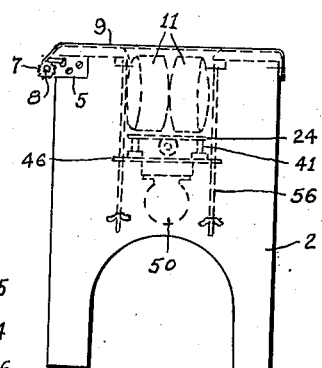
Figure 2 is a rear view of my machine, showing the massage attachment by dotted lines.
Figure 4:
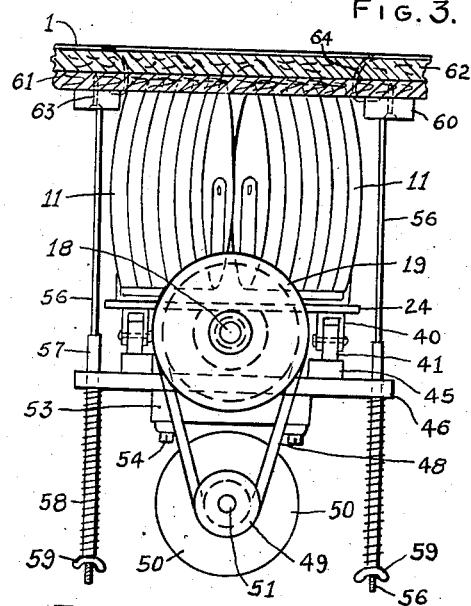
Figure 4 is a front sectional view of my machine along the lines 4—4 of Figure 1.
Figure 5:
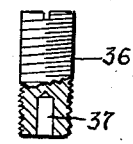
Figure 5 is a fragmental view of the set screw for adjusting the rider in relation to the drive screw.
Figure 6:
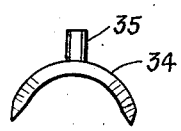
Figure 6 is a side view of the screw rider.
Figure 7:
Figure 7 is a top view of the screw rider.

Referring to the drawings in detail, 1 is a table top upon which the subject lies, and in which is an opening defined by the rounded edges 64. Top 1 is supported by base 2. A fabric covering 9 is stretched across the table top and held taut by being wound on roller 3, the ends of which are supported by pins 6, 8 which ride in openings in brackets 4, 5 that are attached to the leg supports of the table. Cloth roller 3 is held in a rolled position by ratchet wheel 7, which is rigidly affixed to pin 8.

Table top 1 is composed of a resilient layer such as sponge rubber, hair, cotton or other soft material 62 and a wood layer 62 beneath the cork layer.

Frame 46 is swung beneath the opening in the table top by four rods 56, which pass through panels 60 that are attached to wooden layer 61 by nails 63. Enlarged heads of rods 56 prevent them from pulling out of panels 63. The lower end of rods 56, encased in sleeves 57, passes through frame 46, which is supported by compression springs 58 that encircle sleeves 57 and are supported, together with sleeves 57, by adjustable winged nuts 59 that screw upon the lower ends of rods 56.

Reduced ends 14 and 18 of two way screw shaft 10 ride freely in housings 15 which are fastened to the top of frame 46 by bolts 16 and nuts 17. Faces 13 integral with screw shaft 10 press against the inner faces of housings 15. End 18 of shaft 10 projects beyond housing 15 a sufficient length to carry pulley 19, which is rigidly affixed to end 18 by set screw 20. Pulley 19 and shaft 10 are turned by belt 48 which is motivated by drive pulley 49 that is attached by pin 52 to shaft 51 of electric motor 50. Motor 50 is attached to block 53 by screws 54, and block 53 is fastened to frame 46 by downwardly pointed nails 55. Motor 50 is operated by lead wires 105.

Carriage 24 is mounted upon tracks 45 by means of wheels 41 that are held in wheel housings 40 by axle screws 42 and nuts 43. Tracks 45 are fastened down upon frame 46 by nails 47.

Sleeve 38 is attached to the bottom of carriage 24 by screws 39, and has its opening longitudinally positioned with respect to carriage 24. Sleeve 38 loosely encloses shaft 10.

Screw 36 loosely passes through one side of sleeve 38. Open rider collar 34 is loosely held at the inner end of screw 36 by stem 35 which freely fits into an opening in the inner end of screw 36. Open collar 34 rides in the groove 12 of two-way screw shaft 10. Stop collar 37 of screw 36 presses against the side of sleeve 38 when screw 36 has been screwed into sleeve 38 sufficiently to permit open collar 34 to ride freely in groove 12. When the rotation of shaft 10 brings open collar 34 to either end of the grooved portion of the shaft, open collar 34, following groove 12, is rotated in screw 36 at a suitable angle to follow groove 12 in the opposite direction along shaft 10. Thus the rotation of shaft 10 carries open collar 34 back and forth along the grooved portion thereof, and thereby, by means of sleeve 38 reciprocates carriage 24 along shaft 10.

Pivotally affixed to carriage 24 by means of screws 25 are two U-shaped holders 23, each holding a rubber massage roller 11, which freely rotates on axle 22, the ends of which ride in openings through the upper ends of bracket 22. Each massage disc is composed of resilient material. The upper edges of massage rollers 11 pass upward through the opening in table top 1.

Adjustable thumb screw 31 screws into bracket 32 which is fastened to the top of carriage 24 by screws 33. The inner end of screw 31 is freely held in block 29 by collar 30 which is integral with screw 31. Links 27 are fastened at one end to the lower side of block 29 by brad 28, which passes downwardly through block 29 and then through holes in links 27. The other ends of links 27 are respectively fastened to projections from the inner ends of the lower parts of holders 23 by brads 26. Links 27 move freely on brads 28 and 26, so that when thumb screw 31 is screwed inwardly through bracket 32 links 27 push the inner sides of holders 23 away from bracket 32, causing holders 23 to rotate on screws 25 in opposite directions with respect to each other. When thumb screw 31 is screwed outwardly through bracket 32, holders 23 are rotated oppositely from the directions in which they rotate when screw 31 is screwed inwardly. Thus the angle between massage rollers 11 may be altered by adjustment of thumb screw 31, but its median is always parallel with the longitudinal center line of the opening in top 1.

At the lower corners of the table braces 67 are fastened to the sides of the base 2 of the table by screw 70. The upper ends of braces 67 extend above table top 1 and have slots 68 in them. Fabric or leather footholders 66 are held to the table by straps 69, which fasten together through slots 68.

Collar 77 is fastened to the center of the front end of base 2 by bolt 78 and nut 79. Sleeve 75 has a right-angled finger which rests in collar 77. Sleeve 75 may be adjusted to and from the end of the table by moving its finger into and out of collar 77 and fixing it with set screw 80. Vertical rod 103 moves up and down through sleeve 75, being held in any desired position by set screw 76. Pulley 73 rotates upon axle 104 which passes through the upper end of rod 103. Rope 72 rides upon pulley 73, having variable weights 74 attached to its lower end and two supporting straps 71, which holds the ends of chin strap 65, attached to its upper end. When chin strap 65 is adjusted beneath the chin of the subject, a pull is extended by the weights 74 on the end of rope 72.

However, it is to be understood that any other suitable means for stretching the body, while being massaged, would come within the scope of this invention.

A modified form of support for frame 46' is shown in Figures 13, 14 and 15. Frame 46', upon which are laid tracks 45', rests at each of its ends upon two compression springs 58' which encircle vertical rods 97 of which the upper ends pass through holes in frame 46 and supporting blocks 98, that are attached to the upper sides of the corners of frame 46'. The lower ends of rods 97 pass through the ends of cross piece 96 and are rigidly held therein by locking nuts 99, one of which is screwed upon each bolt 97 above cross piece 96 and one below cross piece 96. The lower end of vertical shaft 85 screws through an opening in the center of cross piece 96. The upper end of shaft 85 passes through block 81 and the reduced end thereof 64 screws into head 83, which prevents it from pulling out. Head 83 is loosely held in an opening in the upper side of block 81 to shaft 85 to be rotated in block 81. Block 81 is fastened to the lower layer 60 of top 1 by nails 82. Block 91 is fastened to the underside of block 81 by bolt 92 and nut 93. Horizontal handle shaft 90 rides loosely in openings in block 91 and base 2. Beveled gear 88 fastened to the inner end of shaft 90 by brad 89 enmeshes with a beveled gear 86 that encircles shaft 85 near its upper end. A knob handle 95 fits over the squared outer end 94 of shaft 90.

The ends of frame 46' may be raised or lowered by turning knob handle 95 and causing shaft 85 to rotate, thereby raising or lowering cross piece 96 by means of the screwing action of shaft 85 in cross piece 96. As cross-piece 96 is raised or lowered, it moves rods 97 and compression springs 58' upward or downward, causing frame 46' to move upward or downward upon spring 58'.

In the modified form of massage attachment shown in Figure 12 carriage 24' and housings 24' are extended to hold base 100 upon which rests electric motor 101, which is fed by lead wires 106. Attached to motor 101 is vibrator 103, which passes up through the opening in top 1 together with massage rollers 11. A detailed description of a suitable vibrator will be found in applicant's Patent No. 2,156,839 for Applicator for vibratory massagers, dated May 2, 1939.

The operation of my massage machine is as follows: The subject lies prone, back downwards, on the cover 9 which protects him from the surface of the table and of the massage rollers. Motor 50 is started, imparting rotation to shaft 10 through belt 48. The massage rollers, or other massage attachment, are then raised either by winged screws 59, or by knob 95 in case the machine has the modified form of support, and are brought into contact with the underside of cover 9 through the opening in the top of the table. The subject lies upon the table so that the pressure of one massage roller through the fabric cover is on each side of his spinal column. He is held firmly in position by footstraps 66 and headstrap 65.

The massage attachment is reciprocated by the rotation of shaft 10 so that the massage rollers roll freely back and forth along each side of the spinal column. Compression springs 58 or 58' permit the support to yield and the massage attachment to adapt itself to the contours of the subject's body. The speed of reciprocation of the massage attachment is controlled by the speed control switch connected in the lead wires of the motor.

Of course, it is contemplated a master control may be employed to raise either end of the massaging unit or both ends simultaneously and that head or foot straps may be dispensed with if desired. It is also contemplated that any other appropriate resilient means such as leaf springs, rubber, etc., may be substituted for the helical springs.

Referring to the modification of Figure 19, 2' designates supporting end through which shaft 90' extends, the free end of shaft 90' having a rectangular portion for engagement with a wrench or lifting mechanism for turning said shaft. Intermediate its ends are cross pins 10', 10', one of said cross pins being located adjacent one end and the other cross pin being located adjacent the other end. The shaft 90' is set in bearings 91', 91' against which are abutted beveled gears 92', 92'. These beveled gears are oppositely positioned with respect to each other, the farther gear being away from the support 2', and the other gear being toward the support 2'. These beveled gears 92' have extensions 93', and these extensions have bores extending not only through them but also through the main body of the gear 92'. The bores are of greater size than the shaft. Interposed between the gears 92' and the shaft 90' are collars 95' having extensions 94' of lesser diameter than the collars for the reception of the gears 92'. The collars 95' are rigidly secured to the gears 92' and at their front ends recesses 96' for the reception of the cross pins 10'. When the cross pins 10' are seated in the recesses 96', the collar, and in turn the gear 92' turn with the shaft 90'. Positioned between the bearings 91', 91' and rigidly mounted upon the shaft 90' is a supplemental collar 98', which collar is secured to the shaft 90' by means of a pin or other suitable securing device 98'. Interposed between the supplemental collar 96' and the outer bearing 91' is a helical spring 99'. This spring urges the supplemental collar 97' away from the bearing 91' and causes the outer cross pin 10' to seat in the recess of the outer collar 95', so that the gear 92' will rotate with the shaft 90'. When in this position, it may be noted that the inner pin 10' of shaft 90' is disengaged from recess 96', so that the shaft 90' is free to rotate with respect to the gear 92' and rotation of the shaft 90' imparts no motion to the inner gear 92' which is meshed with a second beveled gear 99' mounted on supplemental shaft 100' by means of pin or other suitable securing device 101'. Mounted on the opposite end of the supplemental shaft 100' is a second beveled gear 102' which meshes with a gear 103' on shaft 106'.

The opposite end or outer end which has previously been referred to, has a similar supplemental shaft 100' mounted in a bearing 107' and carrying a second beveled gear 102' meshed with a beveled gear 103' mounted on shaft 106'. The foregoing mechanism is for the purpose of raising and lowering the track or the carriage in order to bring the applicator balls 11', 11' into closer or further or lighter contact with the body of the patient. Upon either end of the table is mounted a bracket 104', 104', which bracket serves as a supporting device for shaft 106', 106' and are mounted to the table by pins 18', 18'.

On the base 46' is mounted the usual track 45' running longitudinally of the base. On the back side of the base are mounted at either end thereof, brackets 30', 30', having thumb screws 31', 31' passing therethrough for engagement with the upper faces of the base 46' to clamp the bracket 30' in position. Projecting upwardly from the bracket 35' is an extension 33' which is in reality an arm. This arm is for the purpose to be indicated hereinafter.

Above the base 46' is the shaft 24' which is mounted at the four sides thereof upon rollers 41', 41' in brackets 40' having pivots 42' passing therethrough. The brackets 40' are joined to the carriage 24' in the usual manner.

Projecting from the back side of the shaft 24' is a reversing switch 25' having a flange 60' joined bolts 61' to the carriage 24'. Projecting downwardly from the outer end of the reversing switch 25' is a movable arm 32', its position being well illustrated in Figure 20.

Mounted on the bottom of the carriage 24' is a collar having a screw threaded bore for cooperation with the screw threads on a shaft 10' mounted on the base 46'. The shaft 10' is mounted upon the base 46' and at either end thereof by bearings 38' in the manner heretofore described. Mounted on the outer free end of the shaft 10' is a pulley 19' which is driven by a belt 98' passing over its surface and thence to a motor not shown. The shaft 10' only rotates in one direction at a time. The extended arm 32' contacts the arm 33' of the bracket 30' at either end thereof and wings the arm 32' of the switch 25' back and forth to reverse the direction of the flow of current to the motor (not shown), and in turn reverse the direction of rotation of such motor which controls the rotation of shaft 10'. Leads 27 extend outwardly to the motor and leads 26 extend to the source of electric supply.

In its operation, if it is desired to lift one end of the base 46' higher than the other end in order to create more pressure between the patient's body and the massaging rollers 11', 11' the shaft 90' is pressed inwardly to overcome the effect of the spring 99', the pin 10' is brought into engagement with the recess 96' on the inner collar 95'. This rotates gear 92' which is meshed with gear 99' and in turn rotates gear 102' and gear 103' thereby rotating gear 106', and so to raise and lower the carriage at the inner end. However, when the inward force is removed from shaft 90' the spring urges the shaft onwardly, pressing upon the collar 97'. This disengages the inner cross pin 10' and engages the outer cross pin 10' with the recess 96' in the outer collar 95'. When this occurs gear 92' on the outer end of shaft 90' is rigidly keyed to the shaft and moves with it, thereby rotating gear 99' the outer end of the table which in turn rotates supplemental shaft 107' and the inner gear 102' which is meshed with gear 106' and in turn rotates the shaft 106'. This rotation raises and lowers the table at the outer end depending upon the direction of rotation of shaft 106'.

As the shaft 10' rotates in one direction the carriage is meshed with collar 81'. Collar 81' moves along shaft 10' as it rotates. Reaching the lower end of the shaft, the arm 32' on reversing switch 25' engages with stationary arm 33' of bracket 30'. As the carriage moves still further the switch 32' is moved over and the contacts are changed and reversed so that the direction of rotation of the motor and in turn the shaft 10' are also reversed. The reversal of rotation of the shaft carries the carrier 24 back in the opposite direction until it reaches the outer extremity of the table where the movable arm 32' contacts the stationary arm 33' of the outer bracket 30' and again reverses the switch and in turn the rotation of the motor and the shaft 10'.

Having fully described my invention, I claim:

1. A massage table comprising a table having an opening in the top thereof, a carriage, freely rotating resilient massage rollers carried by the carriage for reciprocating in said opening, a track for said carriage resiliently mounted thereunder for adapting said rollers to contours of the subject's body, said massage rollers being spaced to apply to subject's back on both sides of the spinal column, means for angularly adjusting said rollers with respect to their planes of rotation, means for reciprocating said rollers.

2. A massage table comprising a table having an opening in the top thereof, resilient supporting track positioned beneath said table, means for adjusting the position of said resilient supporting track with respect to said table top a two-way screw shaft mounted upon said supporting track, a massage element mounted on a carriage on said track and reciprocally activated in said opening by the rotation of said shaft, said massage element comprising freely rotating rollers spaced to apply to the subjects back simultaneously on both sides of the spinal column, means for angularly adjusting said rollers with respect to their planes of rotation, means for reciprocating said rollers.

OSCAR THOMAS BUFFALOW.